US009722917B2

United States Patent
Giorgetti et al.

(10) Patent No.: US 9,722,917 B2
(45) Date of Patent: Aug. 1, 2017

(54) TRAFFIC RECOVERY IN OPENFLOW NETWORKS

(71) Applicant: Telefonaktiebolaget L M Ericsson (publ), Stockholm (SE)

(72) Inventors: Alessio Giorgetti, Pisa (IT); Giulio Bottari, Pisa (IT); Piero Castoldi, Pisa (IT); Filippo Cugini, Pisa (IT); Francesco Paolucci, Pisa (IT); Andrea Sgambelluri, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 114 days.

(21) Appl. No.: 14/769,582

(22) PCT Filed: Feb. 26, 2013

(86) PCT No.: PCT/EP2013/053778
§ 371 (c)(1),
(2) Date: Aug. 21, 2015

(87) PCT Pub. No.: WO2014/131429
PCT Pub. Date: Sep. 4, 2014

(65) Prior Publication Data
US 2015/0372902 A1  Dec. 24, 2015

(51) Int. Cl.
*H04L 12/703* (2013.01)
*H04L 12/715* (2013.01)
(Continued)

(52) U.S. Cl.
CPC .......... *H04L 45/28* (2013.01); *H04L 41/0668* (2013.01); *H04L 45/22* (2013.01); *H04L 45/38* (2013.01); *H04L 45/64* (2013.01)

(58) Field of Classification Search
None
See application file for complete search history.

(56) References Cited

U.S. PATENT DOCUMENTS 9,042,234 B1 * 5/2015 Liljenstolpe ............ H04L 45/00
  370/238
2011/0286324 A1 * 11/2011 Bellagamba ........ H04L 41/0677
  370/219

(Continued)

FOREIGN PATENT DOCUMENTS

WO   2011144495   11/2011
WO   2011148306   12/2011
(Continued)

OTHER PUBLICATIONS

2012 IEEE 36th International Conference on Computer Software and Applications Workshops; "A prototype of network failure avoidance functionality for SAGE using OpenFlow" by Tomoya Furuichi et al.

(Continued)

*Primary Examiner* — Diane Lo
(74) *Attorney, Agent, or Firm* — Baker Botts, LLP

(57) ABSTRACT

Traffic recovery is supported at a switching node (20) of an OpenFlow network (5). The switching node (20) has a flow table (23) for storing flow entries (24) which determine forwarding of received packets between the ports. A switching node (20) installs (102) a flow entry for a back up path in the flow table (23). The switching node (20) renews (104, 105) the flow entry for the backup path based on at least one of: (i) an association between the flow entry for the backup path and a flow entry for a working path at the switching node, wherein the flow entry for the backup path is renewed when the flow entry for the working path is used to forward a received packet; (ii) receiving a flow entry renewal packet from another switching node on the backup path. A backup path can be configured for each of multiple points of failure in the working path.

19 Claims, 17 Drawing Sheets

(51) Int. Cl.
*H04L 12/707* (2013.01)
*H04L 12/24* (2006.01)
*H04L 12/721* (2013.01)

(56) References Cited

U.S. PATENT DOCUMENTS

| | | | | |
|---|---|---|---|---|
| 2011/0317701 | A1* | 12/2011 | Yamato | H04L 45/04 370/392 |
| 2013/0028073 | A1* | 1/2013 | Tatipamula | H04L 41/12 370/218 |
| 2013/0246655 | A1* | 9/2013 | Itoh | H04L 12/56 709/238 |

FOREIGN PATENT DOCUMENTS

| | | |
|---|---|---|
| WO | 2011161575 | 12/2011 |
| WO | 2012160465 | 11/2012 |
| WO | 2012177213 | 12/2012 |
| WO | 2013000507 | 1/2013 |

OTHER PUBLICATIONS

Software Defined Networks; "Scalable Fault Management for OpenFlow" by James Kempf et al, 2012.
IEEE International Workshop on Management of Emerging Networks and Services; "In-packet Bloom filter based data center networking with distributed OpenFlow controllers" by Carlos A.B. Macapuna et al, 2010.
2011 8th International Workshop on the Design of Reliable Communication Networks (DRCN); "Enabling Fast Failure Recovery in OpenFlow Networks" by Sachin Sharma et al.
Ericsson News Center; "Taking SDN from concept to reality", Nov. 6, 2012.
Carrier SDN / SDN Architectures; "Ericsson CTO: Let's Redefine SDN" by Ray Le Maistre, Oct. 16, 2012.
OpenFlow Switch Specification; Version 1.1.0 Implemented (Wire Protocol 0x02), Feb. 28, 2011.
International Search Report for International application No. PCT/EP2013/053778, Nov. 11, 2013.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                            Dst_MAC2                           |
+-+-+-+-+-+-+-+-+-+-+-+-+-+-+-+-+-+-+-+-+-+-+-+-+-+-+-+-+-+-+-+-+
|            Dst_MAC1           |            Src_MAC1           |
+-+-+-+-+-+-+-+-+-+-+-+-+-+-+-+-+-+-+-+-+-+-+-+-+-+-+-+-+-+-+-+-+
|                            Src_MAC2                           |
+-+-+-+-+-+-+-+-+-+-+-+-+-+-+-+-+-+-+-+-+-+-+-+-+-+-+-+-+-+-+-+-+
|           Renw_type           |              pad1             |
+-+-+-+-+-+-+-+-+-+-+-+-+-+-+-+-+-+-+-+-+-+-+-+-+-+-+-+-+-+-+-+-+
|                                                               |
//                       pad2 (48 byte)                        //
|                                                               |
+-+-+-+-+-+-+-+-+-+-+-+-+-+-+-+-+-+-+-+-+-+-+-+-+-+-+-+-+-+-+-+-+
```

Fig. 9

TRAFFIC RECOVERY IN OPENFLOW NETWORKS

PRIORITY

This nonprovisional application is a U.S. National Stage Filing under 35 U.S.C. §371 of International Patent Application Serial No. PCT/EP2013/053778, filed Feb. 26, 2013, and entitled "Traffic Recovery in Openflow Networks."

TECHNICAL FIELD

This invention relates to OpenFlow networks and to traffic recovery in such networks.

BACKGROUND

In Software Defined Network (SDN) architectures the network intelligence is centralised in a single element, called the network controller, with the aim of reducing the complexity of the switching elements in the data plane. Open-Flow is an example of an SDN architecture. In OpenFlow networks, the OpenFlow Protocol is used through a secure channel for the communications between the network controller and the switching elements. The controller decides how to deliver traffic by programming the flow-tables of switching elements. A flow-table consists of several flow-entries. Each flow-entry is composed of: a flow-match composed of a set of fields to identify the incoming packets, an action, to process the matching packets, and several counters, to provide flow statistics of the switch. Packets matching one installed entry are forwarded by the switch without involving the controller. Packets not matching any of the installed entries are sent to the controller, that, in turn, will compute a proper route and install the required entries in the data plane.

OpenFlow is currently under consideration for other scenarios, such as optical metro and transport networks where network reliability is an important requirement. However, OpenFlow Specifications 1.1 and 1.2 just provide preliminary reliability functionalities, such as fast failover groups.

Extensions to enable fast recovery in OpenFlow networks have been proposed by S. Sharma et al., "Enabling Fast Failure Recovery in OpenFlow Networks," 2011 8th International Workshop on the Design of Reliable Communication Networks (DRCN), 2011, October 2011, pp. 164-171. This requires a full-state controller which is aware of all the flows installed in the network. Upon failure, the full-state controller is notified so that it can identify all the disrupted flows and update the data plane flow-entries considering the specific failure. Other approaches are described in D. Staessens, et al., "Software Defined Networking: Meeting Carrier Grade Requirements," in Proc. LANMAN, 2011, October 2011; and J. Kempf, et al., "Scalable Fault Management for OpenFlow," in Proc. ICC 2012, June 2011.

SUMMARY

An aspect of the present invention provides a method of supporting traffic recovery at a switching node of an Open-Flow network. The switching node has a plurality of ports and the switching node has at least one flow table for storing flow entries which determine forwarding of received packets between the ports. The method comprises receiving an instruction from a controller to configure a backup path at the switching node. The method further comprises installing a flow entry for the backup path in the at least one flow table of the switching node. The method further comprises renewing the flow entry for the backup path based on at least one of: an association between the flow entry for the backup path and a flow entry for a working path at the switching node, wherein the flow entry for the backup path is renewed when the flow entry for the working path is used to forward a received packet; and receiving a flow entry renewal packet from another switching node on the backup path.

Advantageously, the association can be between the flow entry for the backup path and the flow entry for the working path, wherein the flow entry for the working path defines a forwarding from a first port and the flow entry for the backup path defines a forwarding from a second port.

Advantageously, there is a plurality of flow entries for backup paths and the plurality of flow entries are associated with the flow entry for the working path at the node.

Advantageously, the method further comprises receiving an instruction to configure the working path at the switching node and installing a flow entry for the working path in the at least one flow table of the switching node.

Advantageously, the flow entry for the working path has a higher priority entry compared to the flow entry for the backup path.

Advantageously, the method further comprises determining a failure in the working path and, in response to determining the failure, removing the flow entry associated with the working path and using the flow entry for the backup path to forward received packets.

Advantageously, the method further comprises monitoring an idle period for which a flow entry has not been used and the renewing comprises resetting the idle period.

Advantageously, the method further comprises sending a packet to another switching node of the backup path node indicating that the flow entry for the backup path should be renewed. This step can be performed by a switching node located at a fork point on the working path.

Advantageously, the method further comprises determining a failure of a link connected to one of the ports of the switching node and, in response to determining the failure, removing any of the flow entries in the at least one flow table which use that port.

Advantageously, each flow entry comprises a source address and a destination address and the step of renewing the flow entry for the backup path based on an association between the flow entry for the backup path and a flow entry for a working path at the node comprises associating flow entries with the same source address and destination address.

Advantageously, the flow entry renewal packet carries information which matches a flow entry for the backup path.

Advantageously, the flow entry for the backup path comprises a source address and a destination address and wherein the flow entry renewal packet includes the same source address and destination address.

Advantageously, the flow entry renewal packet comprises a field indicating that the packet is for the purpose of flow entry renewal.

Advantageously, the method further comprises receiving an instruction from the controller to configure the sending of flow entry renewal packets along the backup path and sending, on a periodic basis, a flow renewal packet to another switching node on the backup path.

An aspect of the present invention provides a method of supporting traffic recovery in an OpenFlow network. The OpenFlow network comprises a plurality of switching nodes and a controller which is connected to switching nodes. The method comprises, at the controller, receiving a request for a protected traffic path between a first switching node and a second switching node of the OpenFlow network. The method further comprises computing a working path between the first switching node and the second switching node of the OpenFlow network via at least one intermediate switching node. The method further comprises computing a backup path between the first switching node and the second switching node. The method further comprises sending instructions to the switching nodes to configure the working path and the backup path. The method further comprises sending an instruction from the controller to configure at least one of the switching nodes on the working path to periodically send a flow entry renewal packet along the backup path to renew the flow entry for the backup path in switching nodes of the backup path.

Advantageously, the step of computing a backup path comprises computing a plurality of backup paths between the first switching node and the second switching node.

Advantageously, each of the backup paths can correspond to a different possible point of failure in the working path, and the step of sending instructions comprises sending instructions to the switching nodes to configure the plurality of backup paths.

Advantageously, the step of computing a backup path comprises computing a plurality of backup paths for a point of failure in each link of the working path.

Another aspect of the invention provides apparatus for use at a switching node of an OpenFlow network. The apparatus comprises a plurality of ports for connecting to links to other switching nodes. The apparatus comprises at least one flow table for storing flow entries which determine forwarding of received packets between the ports. The apparatus comprises an interface for communicating with a controller. The apparatus comprises a flow entry installation module which is arranged to receive an instruction from the controller to configure a backup path at the switching node and to install a flow entry for the backup path in the at least one flow table. The apparatus comprises a flow entry renewal module which is arranged to renew the flow entry for the backup path based on at least one of: an association between the flow entry for the backup path and a flow entry for a working path at the node, wherein the flow entry for the backup path is renewed when the flow entry for the working path is used to forward a received packet; and receiving a flow entry renewal packet from another switching node on the backup path.

Another aspect of the invention provides apparatus for use at a controller of an OpenFlow network comprising a plurality of switching nodes. The apparatus comprises an interface for communicating with the switching nodes. The interface is arranged to receive a request for a protected traffic path between a first switching node and a second switching node of the OpenFlow network. The apparatus comprises a working path route computation module arranged to compute a working path between the first switching node and the second switching node of the OpenFlow network via at least one intermediate switching node. The apparatus comprises a backup path route computation module arranged to compute a backup path between the first switching node and the second switching node. The apparatus comprises a recovery module arranged to send instructions to the switching nodes to configure the working path and the backup path and to send an instruction to configure at least one of the switching nodes on the working path to periodically send a flow renewal packet along the backup path to renew the flow entry for the backup path in switching nodes of the backup path.

An aspect of the invention provides a method of supporting traffic recovery in an OpenFlow network comprising a controller connected to a plurality of switching nodes, wherein the switching nodes are connected by links. The method comprises, at the controller, receiving a request for a protected traffic path between a first switching node and a second switching node of the OpenFlow network. The method comprises computing a working path between the first switching node and the second switching node of the OpenFlow network via at least one intermediate switching node. The method comprises computing a plurality of backup paths between the first switching node and the second switching node. The method comprises sending instructions to the switching nodes to configure the working path and the plurality of backup paths.

Advantageously, each of the plurality of backup paths corresponds to a different possible point of failure in the working path.

Advantageously, the step of computing a plurality of backup paths is performed for a point of failure in each link of the working path.

An aspect of the invention provides apparatus for use at a controller of an OpenFlow network. The OpenFlow network comprises a plurality of switching nodes. The apparatus comprises an interface for communicating with the switching nodes, wherein the interface is arranged to receive a request for a protected traffic path between a first switching node and a second switching node of the OpenFlow network. The apparatus comprises a working path route computation module arranged to compute a working path between the first switching node and the second switching node of the OpenFlow network via at least one intermediate switching node. The apparatus comprises a backup path route computation module arranged to compute a plurality of backup paths between the first switching node and the second switching node. The apparatus comprises a recovery module arranged to send instructions to the switching nodes to configure the working path and the plurality of backup paths.

An advantage of an embodiment is that it is possible to support traffic recovery in a more scalable manner, as less communication is required between the controller and the switching nodes to maintain backup paths.

An advantage of an embodiment is that it is possible to provide traffic recovery in an OpenFlow network which can quickly respond to failures occurring in the network. Advantageously, recovery time depends only on the time required for physical detection of a link failure. Recovery time is improved by avoiding a need to send notifications from switches to controller when a failure occurs, and waiting for computation of a backup path and installing flow entries in the switches for the computed backup path.

Advantageously, it is not necessary to maintain a full-state controller to support traffic recovery, which further helps to allow scalability of OpenFlow technology to larger networks.

Advantageously, embodiments can be applied to metro networks, such as ring or meshed network topologies of OpenFlow-based Ethernet switches.

Embodiments of the present invention can be applied to Internet Protocol (IP)/Multi Protocol Label Switched (MPLS) networks.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory medium. The machine-readable instructions can be downloaded to the storage medium via a network connection.

Advantageous features may be combined as appropriate, as would be apparent to a skilled person, and may be combined with any of the aspects of the invention.

BRIEF DESCRIPTION OF THE DRAWINGS

Embodiments of the invention will be described, by way of example only, with reference to the accompanying drawings in which:

FIG. 9 shows an example packet which can be sent to renew a backup path;

DETAILED DESCRIPTION

Figure 1:
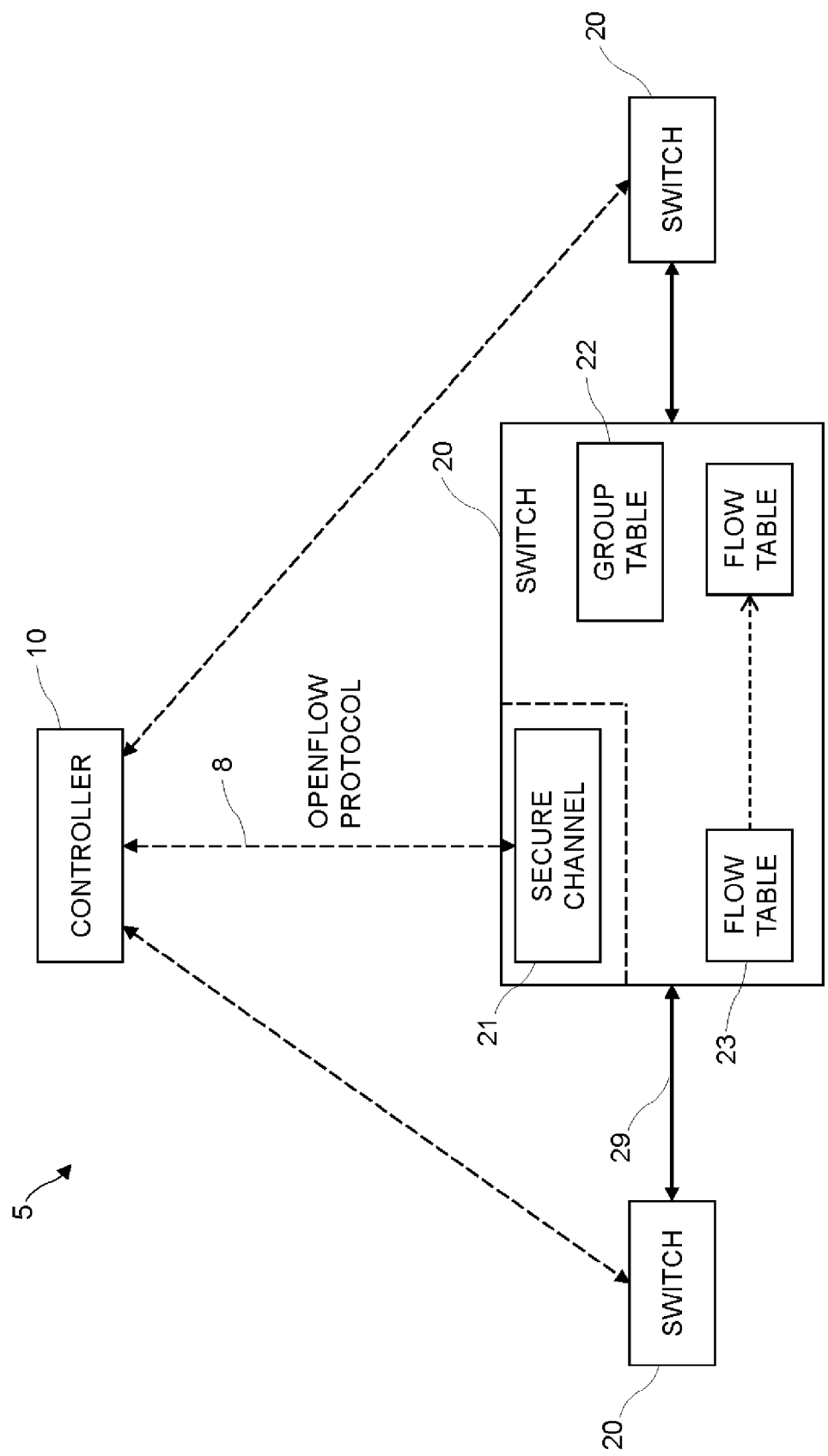
FIG. 1 shows an OpenFlow-based Software Defined Network (SDN) comprising OpenFlow switches and a controller.

FIG. 1 shows the main components of an OpenFlow-based Software Defined Network (SDN) 5. A plurality of switches 20 are connected by links 29 in a network having any suitable topology, such as a ring or mesh. A controller 10 is in communication 8 with the plurality of switches 20. The controller 10 manages the switches 20 by programming flow tables 23 at each of the switches 20. Communication between the controller 10 and the switches 20 uses the OpenFlow protocol over a secure channel 21. Each flow table 23 comprises a set of flow entries 24. Each flow entry 24 comprises a set of fields to match against packets (i.e. the flow-match), an action defining how to process matching packets (e.g., forward toward a specific output port), and several counters used for collecting flow statistics. Packets can be matched using information carried in a header of a received packet, such as source address and destination address. Other information can be also associated to each flow entry 24, such as timers or priority indication. Ports can be physical ports or logical (virtual) ports.

Figure 2:
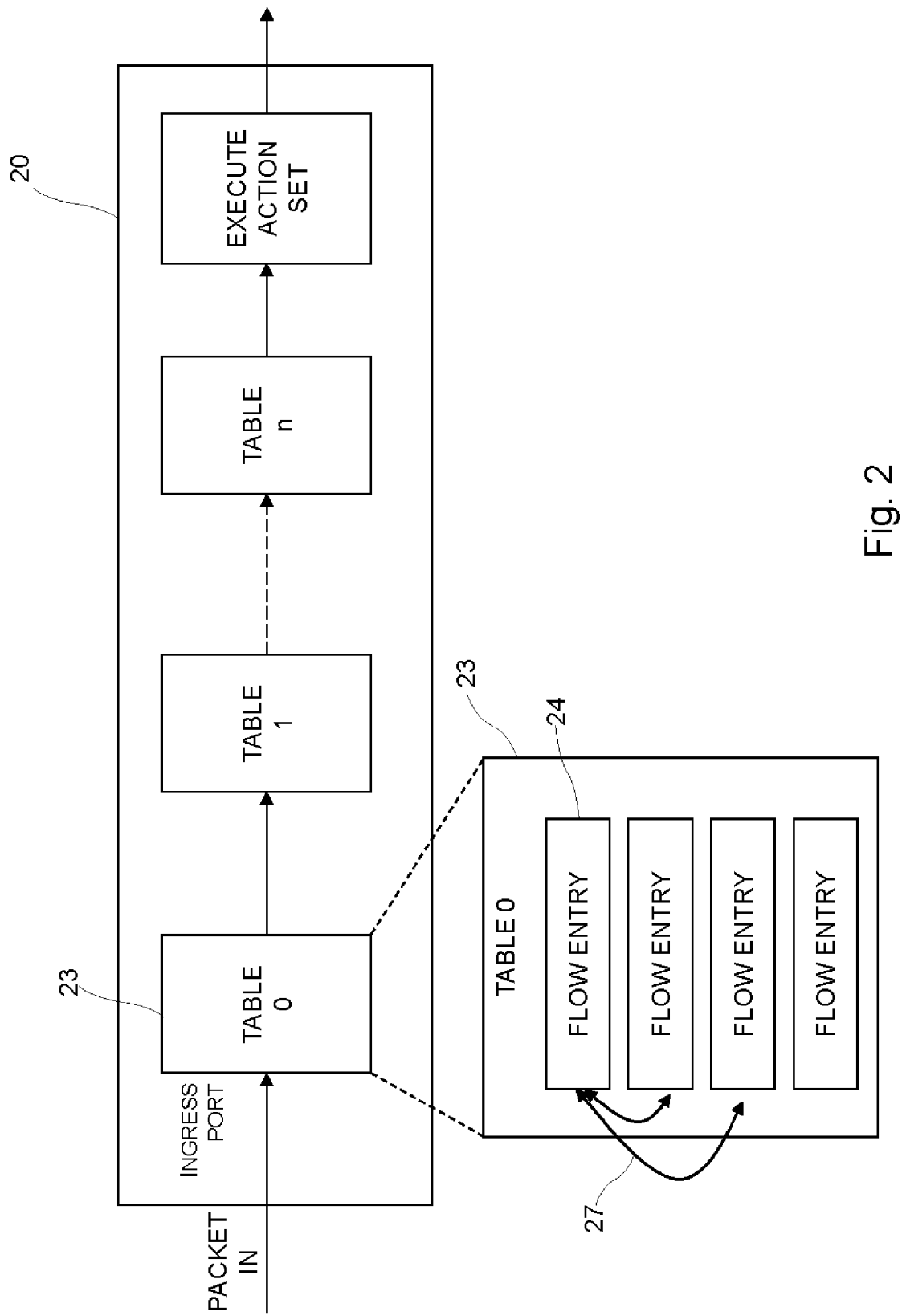
FIG. 2 shows processing of a received packet using flow tables at an OpenFlow switch.

FIG. 2 shows a set of flow tables 23, labeled Table 0, . . . , Table n. A switch 20 may store a single flow table or a set of flow tables. In operation, the switch can match against tables 23 in order, starting with the first flow table (Table 0). Packets not matching any of the installed entries are sent to the controller.

The controller 10 decides how to handle received packets. It can compute a path for packets between a source node and a destination node and install a flow entry in each traversed switch to deliver the matching packets to the proper destination.

In OpenFlow switches 20, each flow entry 24 can be installed with two associated timers, i.e. a hard timeout and an idle timeout. The flow entry 24 is deleted by the switch upon expiration of one of the two timers. The hard timeout is not refreshed and is used to set the maximum duration of each flow entry. The idle timeout is refreshed every time a packet matches the associated entry, and it expires if a flow entry 24 is not used.

A method performed at a switch 20 will now be described. The method comprises three mechanisms for providing fast recovery: (i) a mechanism for removing flow entries relating to failed links, (ii) a mechanism for the installation of flow entries for a working path and one or more back-up paths with different priorities; and (iii) a mechanism for renewing the installed backup flow entries. Each of these will be described in more detail.

A mechanism is provided for removing flow entries relating to failed links. This can be called an "auto-reject" mechanism as, upon failure of a link, it automatically rejects any entries which use the failed link. When a failure of a link is detected, each of the two switches connected to respective ends of the failed link remove all of their flow entries having an input port or an output port connecting to the failed link. Upon receipt of a new flow entry to be installed at the switch, this mechanism can check the status of the ports used by the new flow entry to be installed and, in the case where one of the ports uses a failed link the entry is not installed.

A mechanism is provided for the installation of flow entries for a working path and one or more back-up paths with different priorities. A set of backup entries are pre-configured in the switches for enabling fast recovery. Upon request of a new protected flow between the hosts (Src-Dst), the controller 10 computes the shortest path and configures all the traversed switches by installing the related working entries. Then, the controller 10 computes the backup paths. A backup path is computed for each possible point of failure in the working path. This can mean computing a backup path for each link in the working path which can fail. The required backup entries are then installed to enable the forwarding of packets along the backup paths.

Flow entries for the working path and flow entries for the backup path(s) are installed with different priorities: high priority levels (i.e., $H_i$ in the ingress switch, $H_t$ in transit switches, and $H_e$ in the egress switch) are used for working entries while low priority levels (i.e., $L_i$, $L_t$, and $L_e$) are used for backup entries. Each received packet is forwarded considering the installed matching entry with the highest priority.

A mechanism is provided for renewing the installed backup flow entries. No packets are routed along the backup paths during failure-free operation. This means that the expiration of the idle timeout timer associated with the backup path flow entries may cause these flow entries to be deleted. Therefore, a mechanism is provided to avoid the deletion of backup entries related to active working paths.

Firstly, for each flow the refresh of flow entries for the working path automatically causes the refresh of all of the backup path flow entries associated with that working path flow. An association 27 between flow entries is shown in FIG. 2. Advantageously, the association is between flow entries 24 of one flow table 23. Alternatively, the association can be between flow entries 24 stored in different flow tables 23.

Secondly, a packet can be sent on a periodic basis along each backup path for the purpose of renewing flow entries of the backup path. This special packet will be called a flow entry renewal packet, or simply a renew packet. A field of the renew packet can indicate the purpose of the packet, and can allow an egress switch to distinguish renew packets from regular data-carrying packets.

Figure 3:
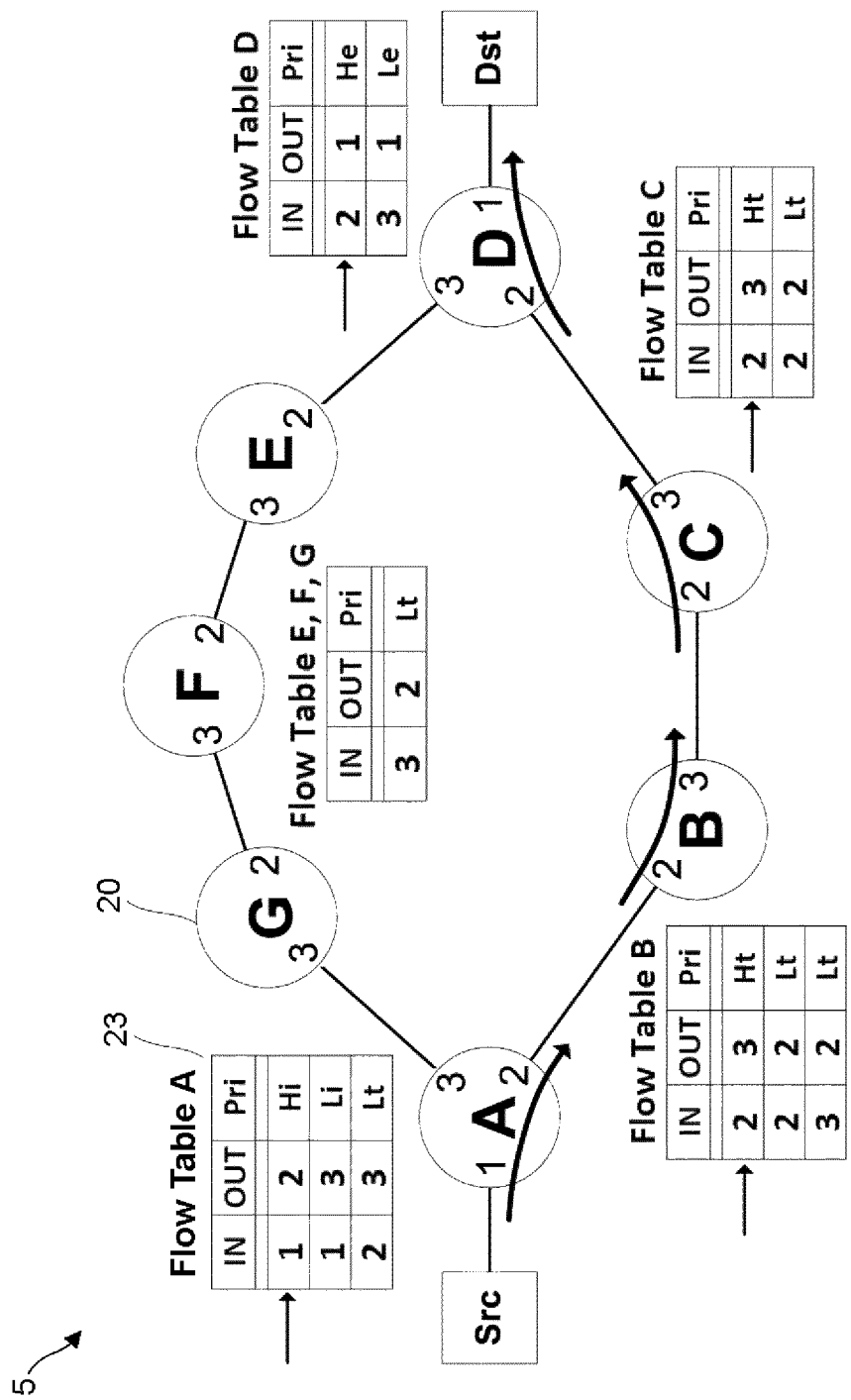
FIG. 3 shows an example network with a ring topology.

An example network 5 is shown in FIG. 3 comprising nodes A-G along with a source Src and a destination Dst. The network 5 shown in FIG. 3 has a ring topology but other topologies are possible, such as a mesh topology. The mechanisms described above will be explained in more detail with reference to FIG. 3. FIG. 3 shows flow entries at each of the nodes A-G for supporting a working path flow between a source node Src and a destination node Dst and additional entries to support back up paths in the event of a failure occurring in the working path. The working path can be called a protected traffic flow because backup paths have been configured to protect the working path. For sake of clarity, the flow entries shown in FIG. 3 just show the triplet comprising input port (IN), output port (OUT), and priority level (Pri). However, other parameters (i.e. Src and Dst MAC addresses) are used for flow matching. Port numbers are indicated on each switch 20.

The working path is the path A-B-C-D. Backup paths are configured for multiple points of failure of the working path, i.e. for failure of any one of the links A-B, B-C or C-D. At ingress node switch A, a flow table is configured with one working path entry and two backup path entries. The working path entry $(1, 2, H_t)$ enables the packet switching from the host Src towards node B by forwarding data packets received on port 1 (from host Src) to port 2. This entry has a high priority $(H_t)$. A first backup path entry $(1, 3, L)$ is configured for a case of a failure of the adjacent link (A-B) to enable the forwarding of packets received on port 1 from the host Src to port 3. This entry has a low priority $(L_t)$. A second backup entry $(2, 3, L_t)$ is configured to support transmit traffic in the case of failure of remote links along the working path, such as links B-C or C-D. This enables the forwarding of packets received on port 2 to port 3. This entry has a low priority, and is indicated as being for transit purposes (L).

Switches at nodes B and C are configured with a working path entry $(2, 3, H_t)$ and with at least one backup path entry $(2, 2, L_t)$. The working path entry $(2, 3, H_t)$ enables the forwarding of packets received on port 2 to port 3. This entry has a high priority $(H_t)$. At nodes B and C there is a first backup path entry $(2, 2, L_e)$ for a case of a failure of the adjacent link (B-C for node B, C-D for node C). This enables the forwarding of packets received on port 2 back out from port 2. This has the effect of sending traffic back to node A, from where the traffic can follow the backup path A-G-F-E-D. This entry has a low priority $(L_t)$. At node B there is a second backup entry $(3, 2, L_t)$ to support transmit traffic in the case of failure of remote link (C-D) along the working path. This enables the forwarding of packets received on port 3 to port 2. This entry has a low priority, and is indicated as being for transit purposes $(L_t)$. The egress switch at node D is configured with a working path entry $(2, 1, H_e)$ and a backup path entry $(3, 1, L_e)$. The working path entry $(2, 1, H_e)$ enables the forwarding of packets received on port 2 to port 1. This entry has a high priority $(H_e)$. The backup path entry $(3, 1, L_e)$ enables the forwarding of packets received on port 3 to port 1. This entry has a low priority $(L_e)$.

The switches at nodes G, F and E are only used in the event of a failure along the working path A-B-C-D. Nodes G, F and E are transit switches, and are configured with one backup entry, $(3, 2, L_t)$. This enables the forwarding of packets received on port 3 to port 2. This entry has a low priority, and is indicated as being for transit purposes $(L_t)$.

Figure 4:
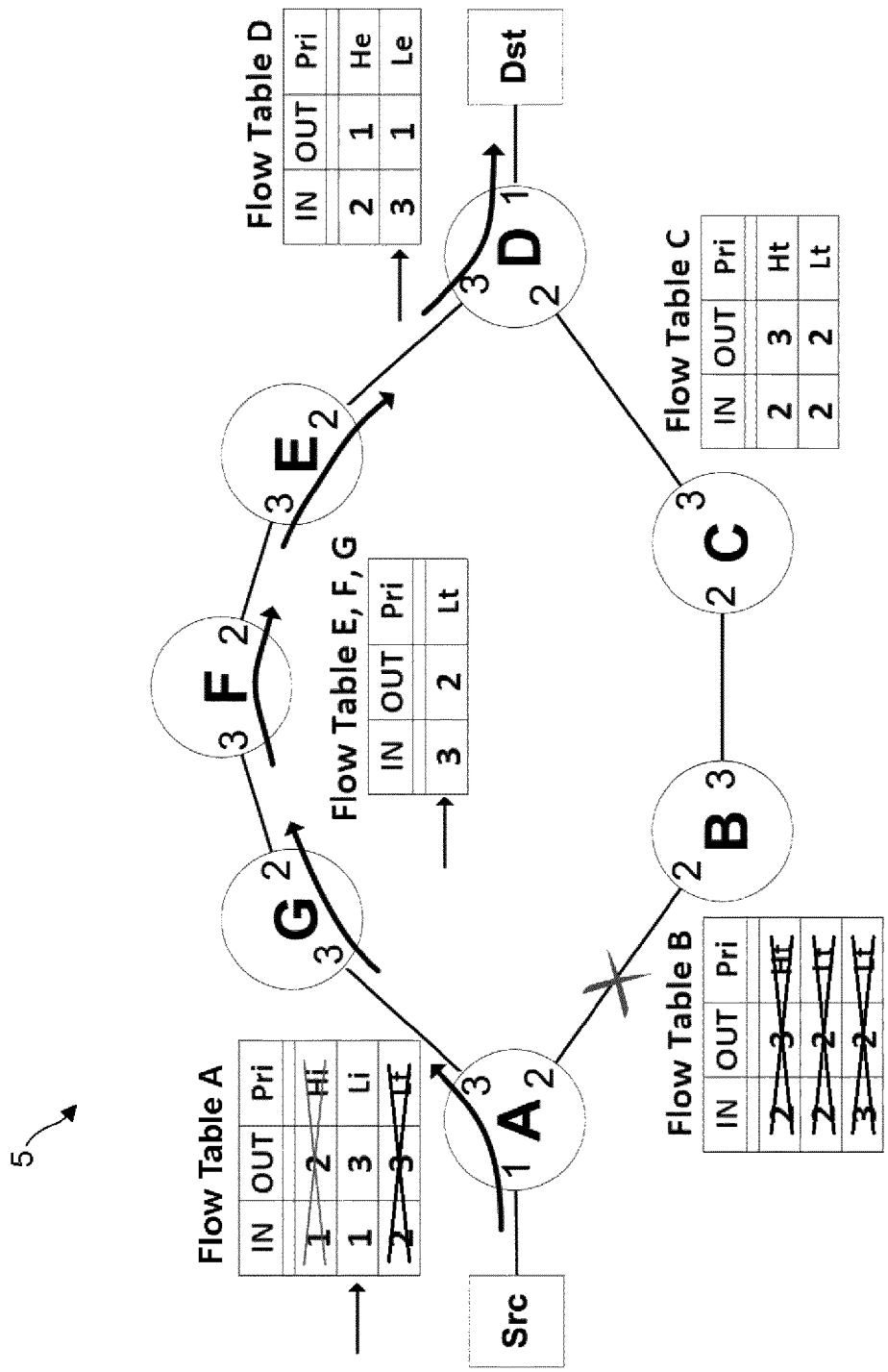
FIGS. 4 and 5 show operation of the network of FIG. 3 upon failure of a link.
Figure 5:
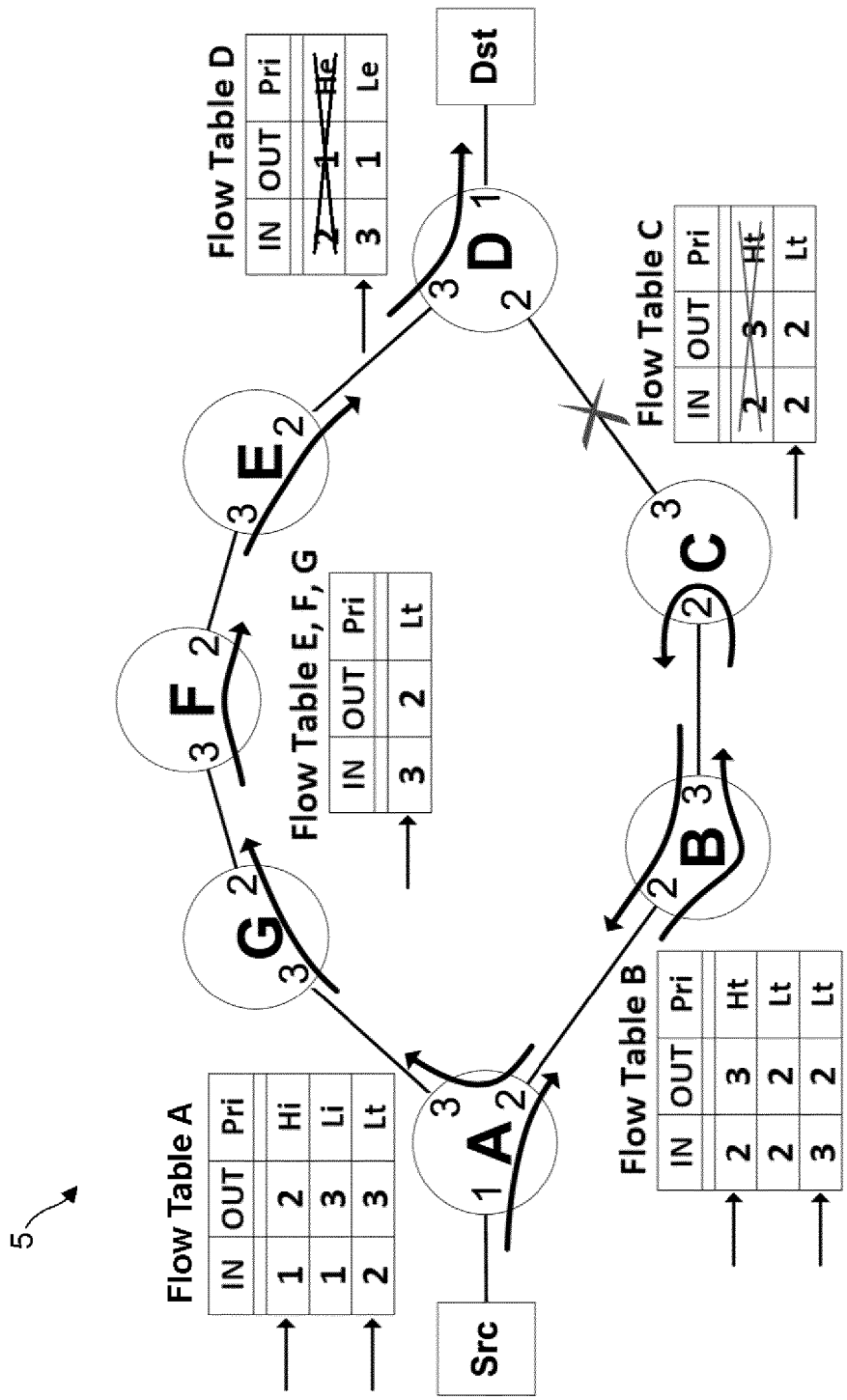

FIGS. 4 and 5 show the backup paths used in case of a failure occurring in the working path. FIG. 4 shows failure of link A-B. Failure of link A-B is detected by node A. Link A-B connects to port 2 of node A. The "auto-reject" mechanism removes the flow entries $(1, 2, H_t)$ and (2, 3, Lt) which use port 2. This leaves flow entries for the configured backup paths. The lower priority flow entry $(1, 3, L_t)$ is used. The backup path is A-G-F-E-D. Node B, at the other end of the failed link A-B, also detects the failure of link A-B. Link A-B connects to port 2 of node B. The "auto-reject" mechanism causes node B to remove the flow entries which use port 2. At each of nodes G, F and E the flow entry configured at those nodes is used. At egress node D, the flow entry $(3, 1, L_e)$ is used to forward traffic to the destination node Dst.

FIG. 5 shows failure of link C-D. Failure of link C-D is detected by node C. Link C-D connects to port 3 of node C. The "auto-reject" mechanism removes the flow entry $(2, 3, H_t)$ which uses port 3. This leaves flow entries for the configured backup path. The lower priority flow entry $(2, 2, L_t)$ is used. This causes traffic to be forwarded back along the path from which it has just been received. The overall backup path is A-B-C-B-A-G-F-E-D. Node D, at the other end of the failed link C-D, also detects the failure of link C-D. Link C-D connects to port 2 of node D. The "auto-reject" mechanism causes node D to remove the flow entries which use port 2. At node B, traffic continues to be forwarded along the operational part of the working path using the flow entry $(2, 3, H_t)$ because no fault has occurred on the link connected to node B. Node B also forwards traffic from port 3 to port 2 using the flow entry $(3, 2, L_t)$. At node A, traffic continues to be forwarded along the operational part of the working path using the flow entry $(1, 2, H_t)$ because no fault has occurred on the link connected to node A. Node A also forwards traffic from port 2 to port 3 using the flow entry $(2, 3, L_t)$. Each of nodes G, F, E and D operate as described above for FIG. 4.

Figure 6:
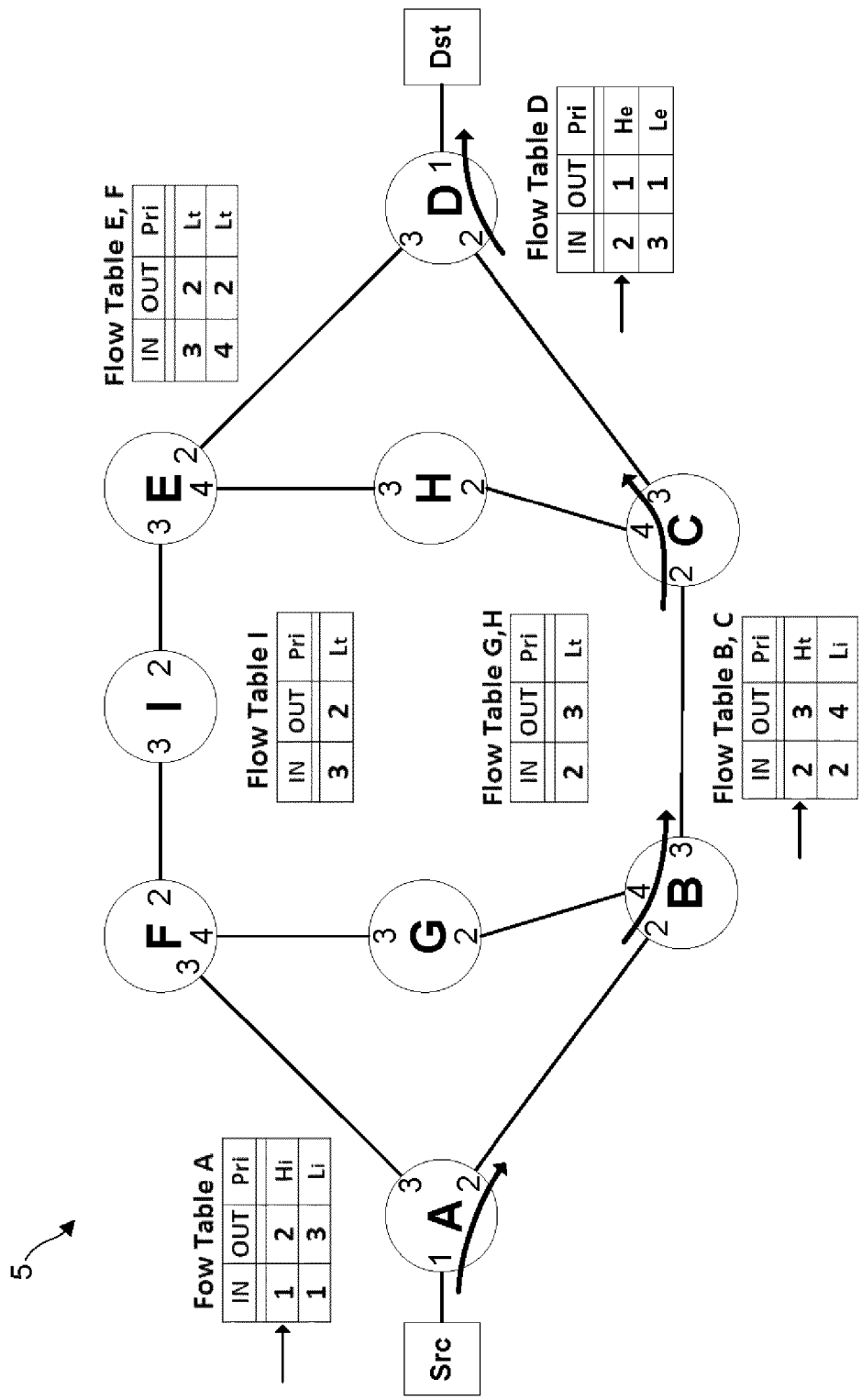
FIG. 6 shows an example network with a meshed topology.
Figure 7:
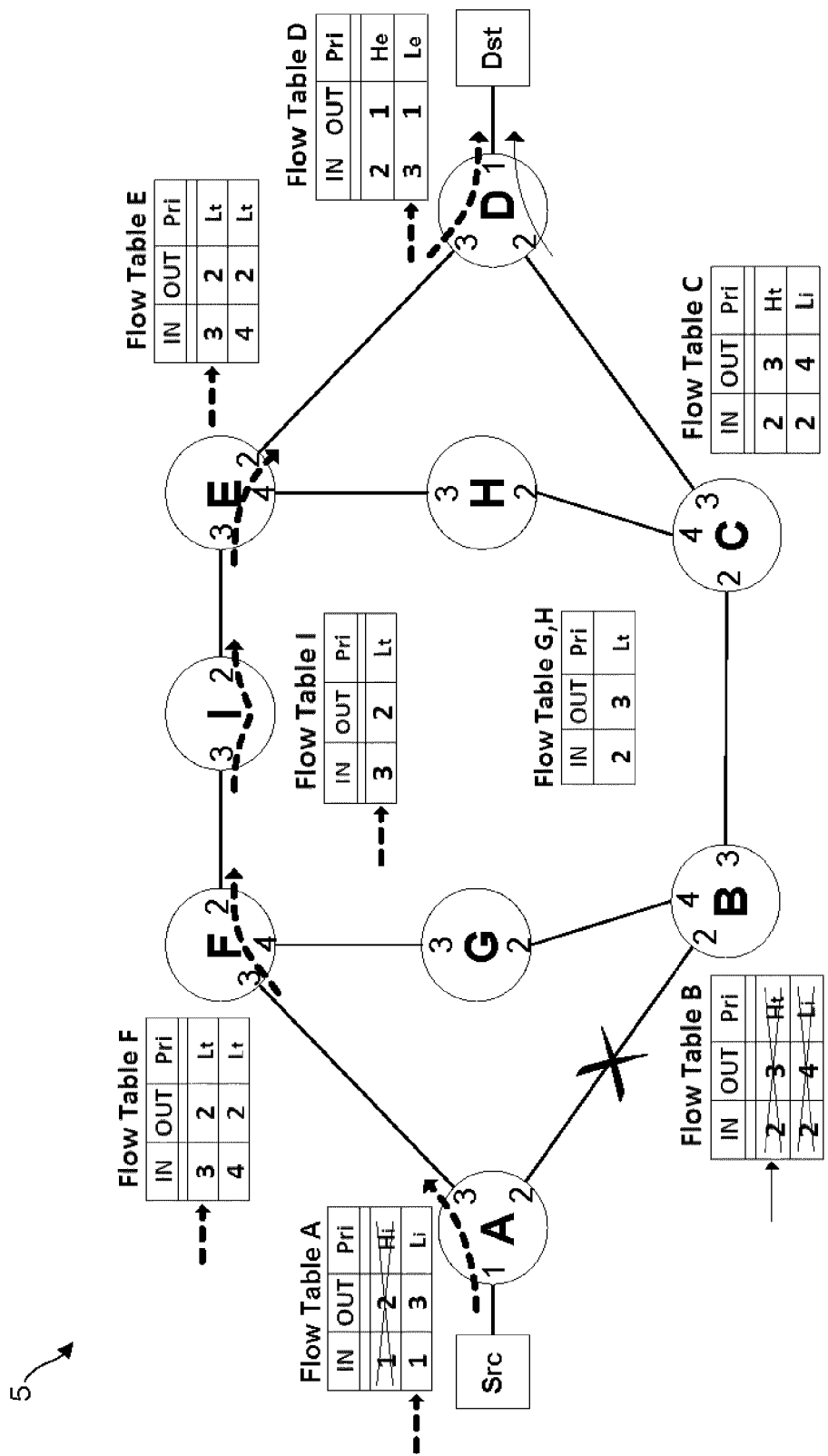
FIGS. 7 and 8 show operation of the network of FIG. 6 upon failure of a link.
Figure 8:
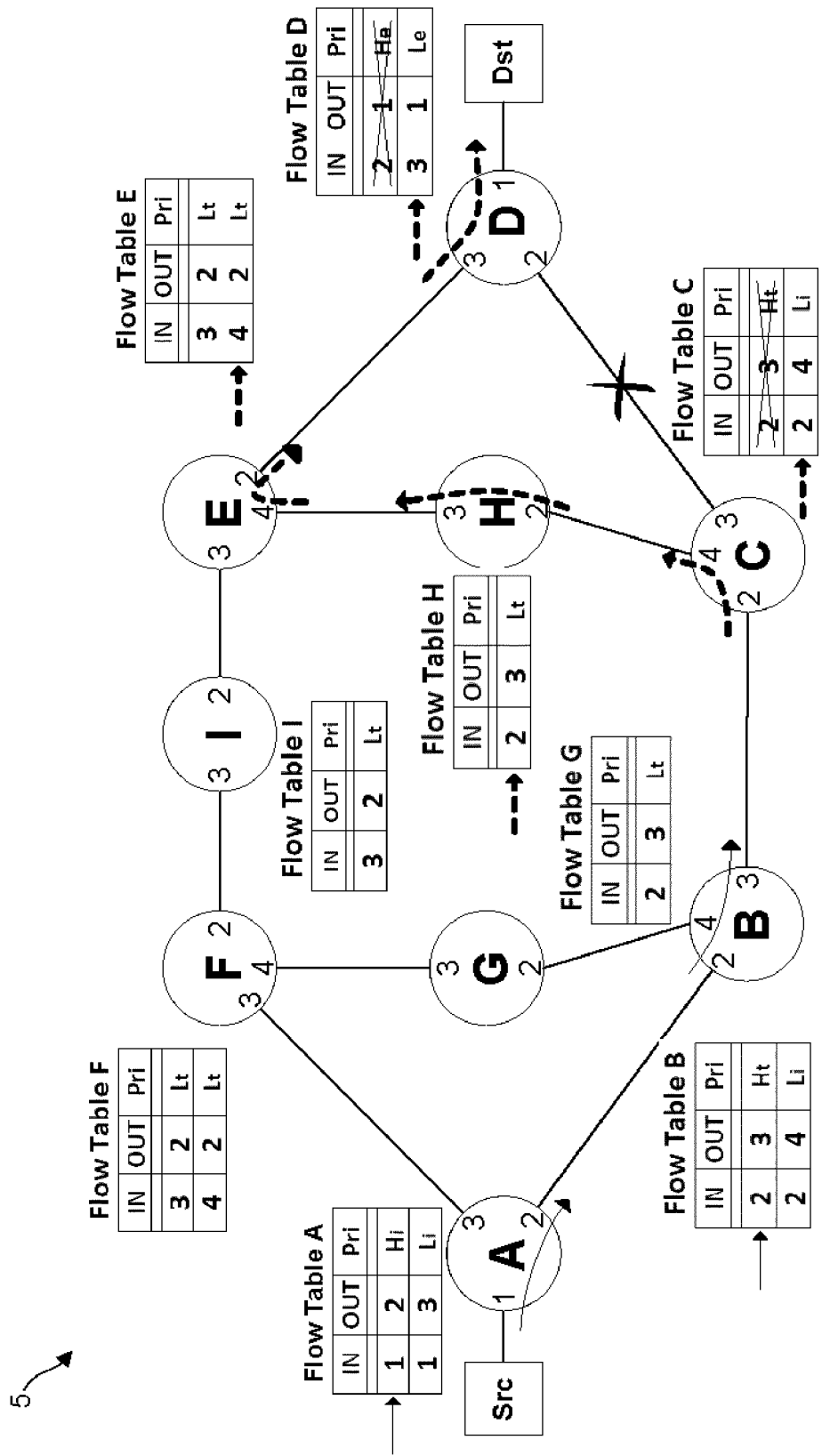

FIGS. 6 to 8 show an example network 5 with a meshed topology comprising nodes A-I along with a source Src and a Destination Dst. FIG. 6 shows flow entries at each of the nodes A-I for supporting a working path flow between a source node Src and a destination node Dst and additional entries to support back up paths in the event of a failure occurring in the working path. The working path is A-B-C-D. Backup paths are configured for multiple points of failure of the working path, i.e. for failure of any one of the links A-B, B-C or C-D. At ingress node switch A, a flow table is configured with one working path entry and one backup path entry. The working path entry $(1, 2, H_t)$ enables the packet switching from the host Src towards node B by forwarding data packets received on port 1 (from host Src) to port 2. This entry has a high priority $(H_t)$. A backup path entry $(1, 3, L_t)$ is configured for a case of a failure of the adjacent link (A-B) to enable the forwarding of packets received on port 1 from the host Src to port 3. This entry has a low priority ($L_i$).

Switches at nodes B and C are configured with a working path entry (2, 3, $H_t$) and with a backup path entry (2, 4, $L_i$). The working path entry (2, 3, $H_t$) enables the forwarding of packets received on port 2 to port 3. This entry has a high priority ($H_t$). The backup path entry (2, 4, L) is configured for a case of a failure of the adjacent link (B-C for node B, C-D for node C). This enables the forwarding of packets received on port 2 to port 4. For node B, this causes traffic to be sent to node G and for node C this causes traffic to be sent to node H. The transit switches B and C are configured with the working entry (2, 3, $H_t$) and with the backup entry (2, 4, L). Egress switch D is configured a working path entry and backup path entry in the same way as previously described. The other transit switches along the backup paths are configured with one or more backup entries: (2, 3, $L_t$) in the switches at nodes G and H; (3, 2, $L_t$) in the switch at node I; (3, 2, $L_t$) and (4, 2, $L_t$) in switches at nodes F and E.

FIGS. 7 and 8 show the backup paths used in case of a failure occurring in the working path. FIG. 7 shows failure of link A-B. Failure of link A-B is detected by node A. Link A-B connects to port 2 of node A. The "auto-reject" mechanism removes the flow entry (1, 2, $H_i$) which uses port 2. This leaves a flow entry for the configured backup path (1, 3, $L_i$). Node B, at the other end of the failed link A-B, also detects the failure of link A-B. Link A-B connects to port 2 of node B. The "auto-reject" mechanism causes node B to remove the flow entries which use port 2. The backup path is A-F-I-E-D. At each of nodes F, I and E the flow entry configured at those nodes is used. At egress node D, the flow entry (3, 1, $L_e$) is used to forward traffic to the destination node Dst.

FIG. 8 shows failure of link C-D. Failure of link C-D is detected by node C and node D. Link C-D connects to port 3 of node C. The "auto-reject" mechanism removes the flow entry (2, 3, $H_t$) which uses port 3. This leaves a flow entry for the configured backup path (2, 4, $L_i$). Node D, at the other end of the failed link C-D, also detects the failure of link C-D. Link C-D connects to port 2 of node D. The "auto-reject" mechanism causes node D to remove the flow entries which use port 2. The backup path in this case is A-B-C-H-E-D. At each of the nodes H and E the flow entry configured at those nodes is used. At egress node D, the flow entry (3, 1, $L_e$) is used to forward traffic to the destination node Dst.

The flow entry for a working path configured at a node can be associated with one or more flow entries of a backup path configured at that node. Referring again to FIG. 3, node B has a working path flow entry (2, 3, $H_t$) and backup path flow entries (2, 2, $L_t$) and (3, 2, $L_i$). The backup path flow entries can be associated with the working path flow entry. When the working path entry (2, 3, $H_t$) is used a timeout timer associated with that entry is reset, which prevents the entry from being automatically deleted from the flow table at the node. Also, due to the association of the working path flow entry with the backup path flow entries (2, 2, $L_t$) and (3, 2, $L_t$), the timeout timers associated with the backup path flow entries are also reset, thereby preventing the backup path entries from being removed from the flow table of the node. It should be noted that the second backup path flow entry (3, 2, $L_t$) has a different ingress port compared to the working path and the first backup path (port 3 compared to port 2), but the flow entries can be renewed together by the association. An association between flow entries is shown schematically in FIG. 2.

In the examples described above there are some nodes which are located on the working path and the backup path(s). For example, nodes A, B and C in FIGS. 3 and 6 have flow entries for a working path and at least one backup path. At these nodes, the working path flow entry can be associated with the backup path flow entry in the manner just described to ensure that the backup path flow entry remains valid for use. This has an advantage of not requiring the controller 10 to refresh backup paths, which helps to improve scalability of the network. Advantageously, one way of implementing the association of a working path flow entry and one or more backup path flow entries is to associate all of the flow-entries relating to the same MAC address pair of source and destination. For example, in FIG. 5 all of the flow entries illustrated refer to the MAC address pair (Src, Dst) and therefore they are all associated in each switch. Advantageously, this association is implemented by the software of the switch and does not require additional instructions to be sent by the controller. Association of working path and backup path flow entries can be made using other identifiers of the paths, such as IP source address and IP destination address.

In the examples described above there are some nodes which are only located on the backup path(s). For example, nodes G, F and E in FIG. 3 and nodes E-I in FIG. 6 only store a flow entry for at least one backup path. No packets are routed along the backup paths during failure-free operation. This means that the expiration of the idle timeout timer associated with the backup path flow entries may cause these flow entries to be deleted. Another mechanism can be provided for renewing the installed backup flow entries of nodes which only form part of a backup path. A special packet can be sent on a periodic basis along each backup path. This special packet can be called a flow entry renewal packet, or simply a renew packet. A field of the renew packet can indicate the purpose of the packet, and can allow an egress switch to distinguish renew packets from regular data-carrying packets. Since the generation rate of renew packets depends on the considered idle timeout (typically several tens of seconds), renew packets use a negligible amount of bandwidth. In FIG. 3, the switch at node A can send renew packets along the backup path A-G-F-E-D. Upon receipt of a renew packet, the idle timeout timer associated with that flow entry is renewed. In this way, the backup entries in switches G, F and E are preserved. Advantageously, the frames carrying renew packets do not reach the host Dst as they are dropped by the egress switch D. Advantageously, this mechanism does not involve the controller or the hosts Src and Dst. In FIG. 6 the switch at node A sends renew packets along the backup path A-F-I-E-D, the switch at node B sends renew packets along the backup path B-G-F-I-E-D, the switch at node C sends renew packets along the path C-H-E-D. In this way, all the backup entries in the switches F, G, I, E, and H are preserved. Advantageously, each of the nodes located at a fork point along the working path (e.g. nodes A, B C in FIG. 6) send renew packets. The controller 10 can instruct the nodes by configuring the entry with priority $L_i$ (where i means ingress of a backup segment).

FIG. 9 shows an example format of a renew packet. A possible implementation of renew packet is to use Ethernet frames of 64 byte size, with source and destination MAC addresses set to the same values as the MAC addresses of the working path and backup path(s) installed at switches 20, and the EtherType field set to the specific value 0x88dd (which is a currently not used value). The EtherType field indicates to switches 20 that the packet is for the purpose of renewing a flow entry, and is not a regular data-carrying packet. Two padding fields pad1, pad2, are also included.

If a failure affects a working path, auto-reject mechanism is triggered at the switches attached to the failed link. After auto-reject of the working entry, the related backup flow entry is automatically used for wrapping the packets along the backup path. Data packets are lost only in the period of time between the failure and the auto-reject (i.e. switch-over time).

If a failure affects a backup path, the auto-reject mechanism deletes the related backup path entries which use the failed link. In this case, data packets are not affected. Renew packets periodically sent along the backup path arrive at the switch attached to the failed link. These renew packets do not match any entries and are therefore forwarded to the controller using OFPT_PACKET_IN packets. To limit these kinds of requests to the controller 10, it is possible to process the OFPT_PACKET_IN containing renew packets as follows. If the failure has been recovered, the backup paths are re-computed and the related entries are re-installed in the traversed switches. Otherwise, the controller 10 installs a null entry with a specific timeout. The hard timeout can be set to several tens of seconds (e.g. 30 s) in such a way that the next renew packets are dropped by the switch, only after hard timeout expiration the next renew packet will be forwarded to the controller inside a OFPT_PACKET_IN packet.

When a link is recovered, the attached switches notify the controller 10 about the topology change, such as by sending a port status message. In this way, new traffic flows are routed using the updated topology. Conversely, traffic flows that have been disrupted by the failure remain on the backup path until the expiration of one of the aforementioned timers.

Figure 10:
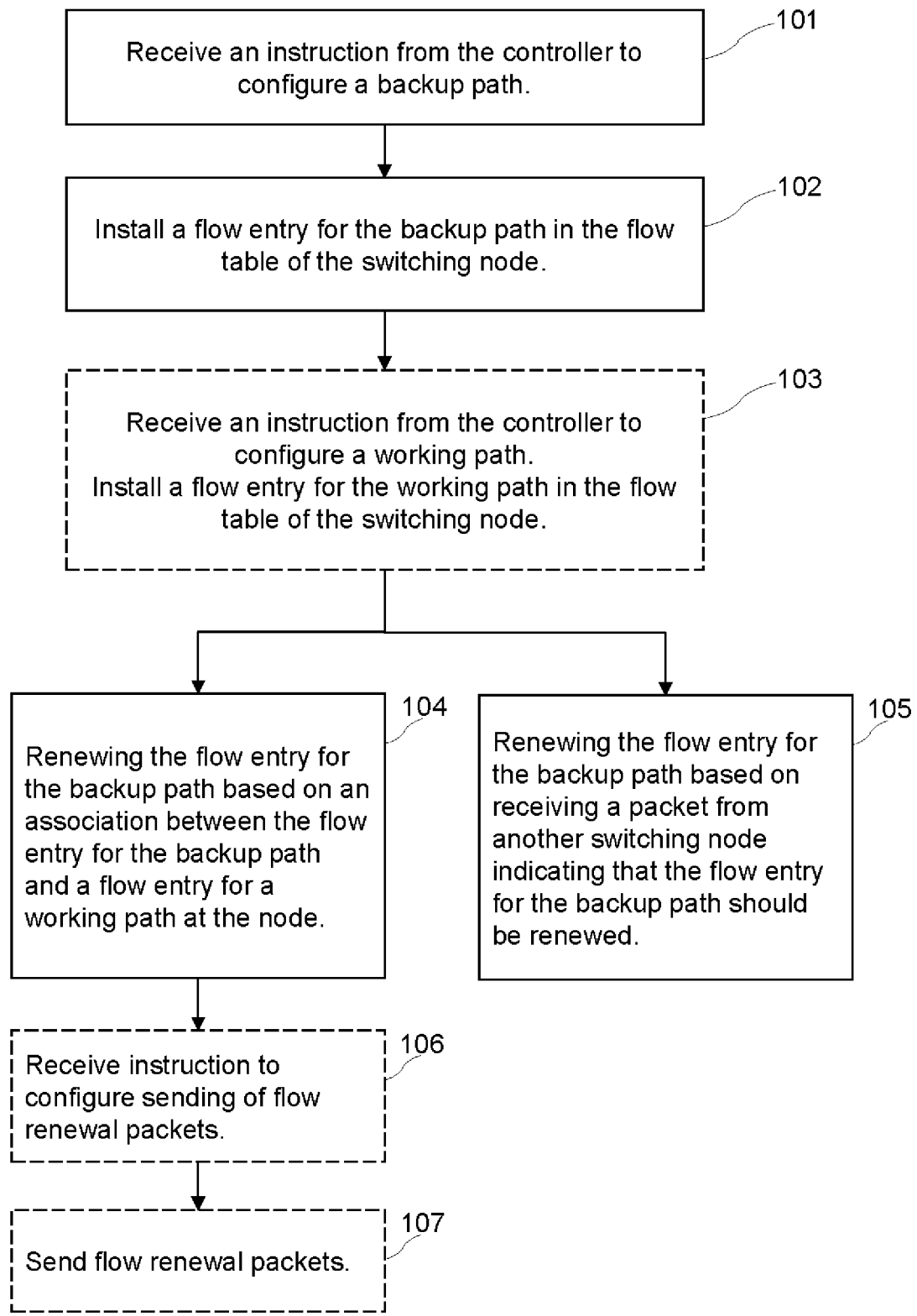
FIG. 10 shows a method of operating a switching node to support traffic recovery.

FIG. 10 shows a method of supporting traffic recovery at a switching node 20 of an OpenFlow network. Step 101 of the method comprises receiving an instruction from the controller to configure a backup path at the switching node. Step 102 comprises installing a flow entry for the backup path in the at least one flow table of the switching node. Step 104 comprises renewing the flow entry for the backup path based on an association between the flow entry for the backup path and a flow entry for a working path at the node. The flow entry for the backup path is renewed when the flow entry for the working path is used to forward a received packet. Step 105 comprises renewing the flow entry for the backup path based on receiving a flow renewal packet from another node. An optional step 103 comprises receiving an instruction to configure the working path at the switching node and installing a flow entry for the working path in the at least one flow table of the switching node. Step 103 is optional because it does not apply to nodes located only on the backup path, such as nodes E, F, G in FIG. 3. Further optional steps 106, 107, can be performed by nodes which are fork points for the working path and backup path. In FIG. 3 nodes A is a fork point of the working path A-B-C-D and the backup path A-G-F-E-D. In FIG. 6, node A is a fork point of the working path A-B-C-D and the backup path A-F-I-E-D, node B is a fork point is a fork point on the working path A-B-C-D and the backup path B-G-F-I-E-D, and node C is a fork point of the working path A-B-C-D and the backup path C-H-E-D. Step 106 comprises receiving an instruction from the controller to configure the sending of flow entry renewal packets along the backup path. Step 107 comprises sending, on a periodic basis, a flow renewal packet to another switching node on the backup path. These steps allow nodes located only on the backup path(s) to renew their flow entries before they expire.

Figure 11:
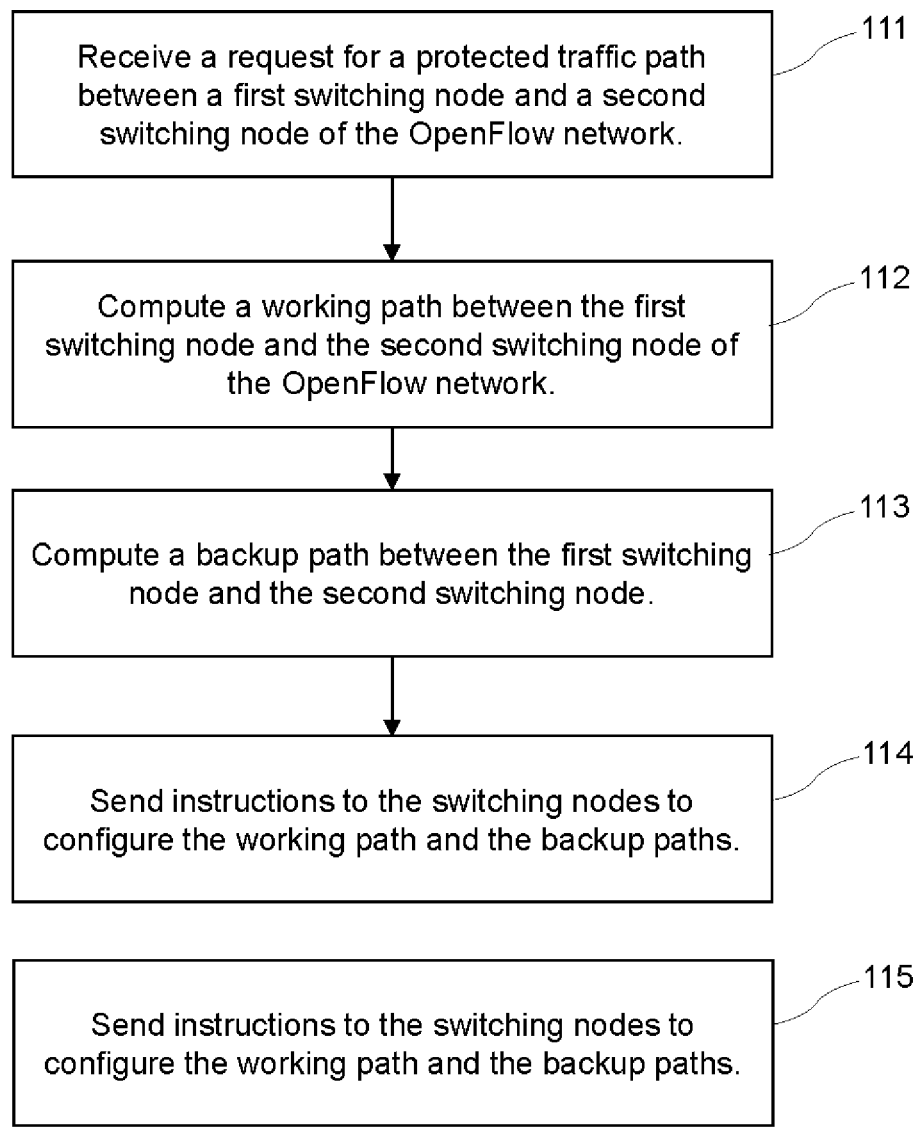
FIG. 11 shows a method of operating a controller to support traffic recovery.

FIG. 11 shows a method of supporting traffic recovery at a controller 10 of an OpenFlow network. Step 111 of the method comprises receiving a request for a protected traffic path between a first switching node and a second switching node of the OpenFlow network. Step 112 comprises computing a working path between the first switching node and the second switching node of the OpenFlow network via at least one intermediate switching node. Step 113 comprises computing a backup path between the first switching node and the second switching node. Step 114 comprises sending instructions to the switching nodes to configure the working path and the backup path. Step 115 comprises sending an instruction from the controller to configure at least one of the nodes on the working path to periodically send a flow entry renewal packet along the backup path to renew the flow entry for the backup path in switches of the backup path. The flow entry renewal packet can, for example, have the format shown in FIG. 10. Advantageously, nodes located at fork points on the working path are instructed to send flow renewal packets. The flow entry renewal packet causes nodes along the backup path to renew the flow entry for the backup path.

Figure 12:
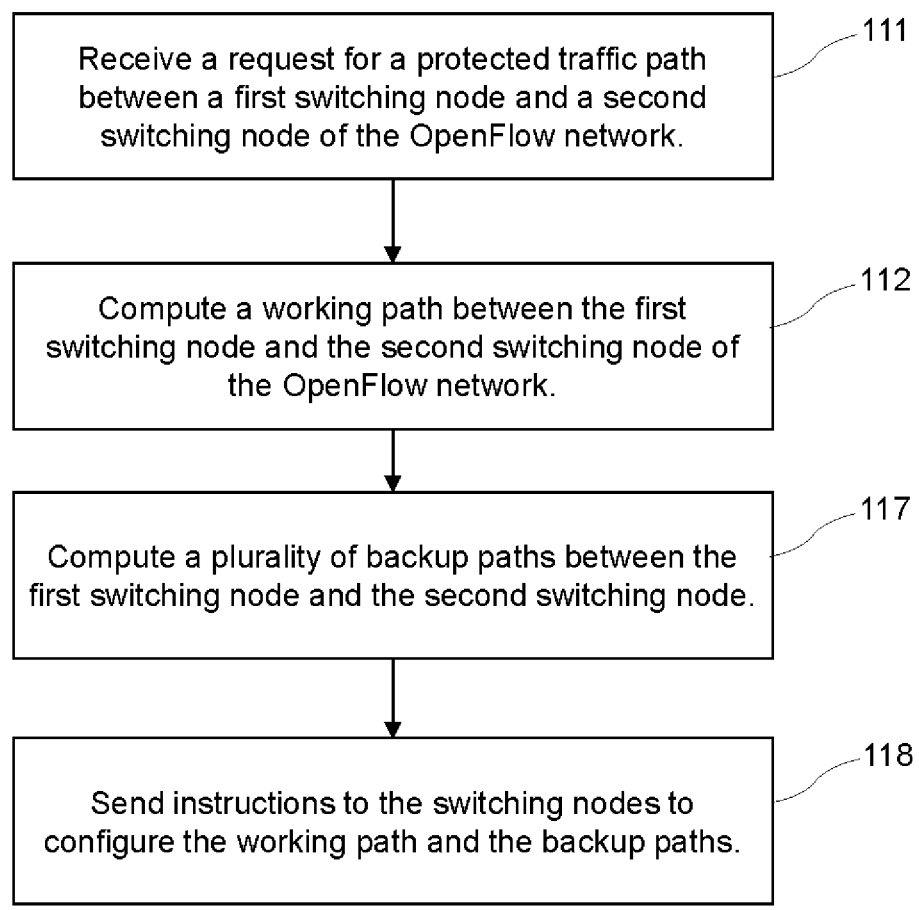
FIGS. 12 and 13 show a method of operating a controller to support traffic recovery.

FIG. 12 shows a method of supporting traffic recovery at a controller 10 of an OpenFlow network. Steps 111 and 112 are the same as shown in FIG. 11. Step 117 comprises computing a plurality of backup paths between the first switching node and the second switching node. Each of the backup paths corresponds to a possible point of failure in the working path. Step 118 comprises sending instructions to the switching nodes to configure the working path and the backup paths. Each of the switching nodes in the working path is provided with a backup path to use upon detecting failure of a link connected to that switching node. The features of the methods shown in FIGS. 11 and 12 can be combined, so that the controller also includes a step 115 of sending an instruction from the controller to configure at least one of the nodes on the working path to periodically send a flow entry renewal packet along the backup path to renew the flow entry for the backup path in switches of the backup path.

Figure 13:
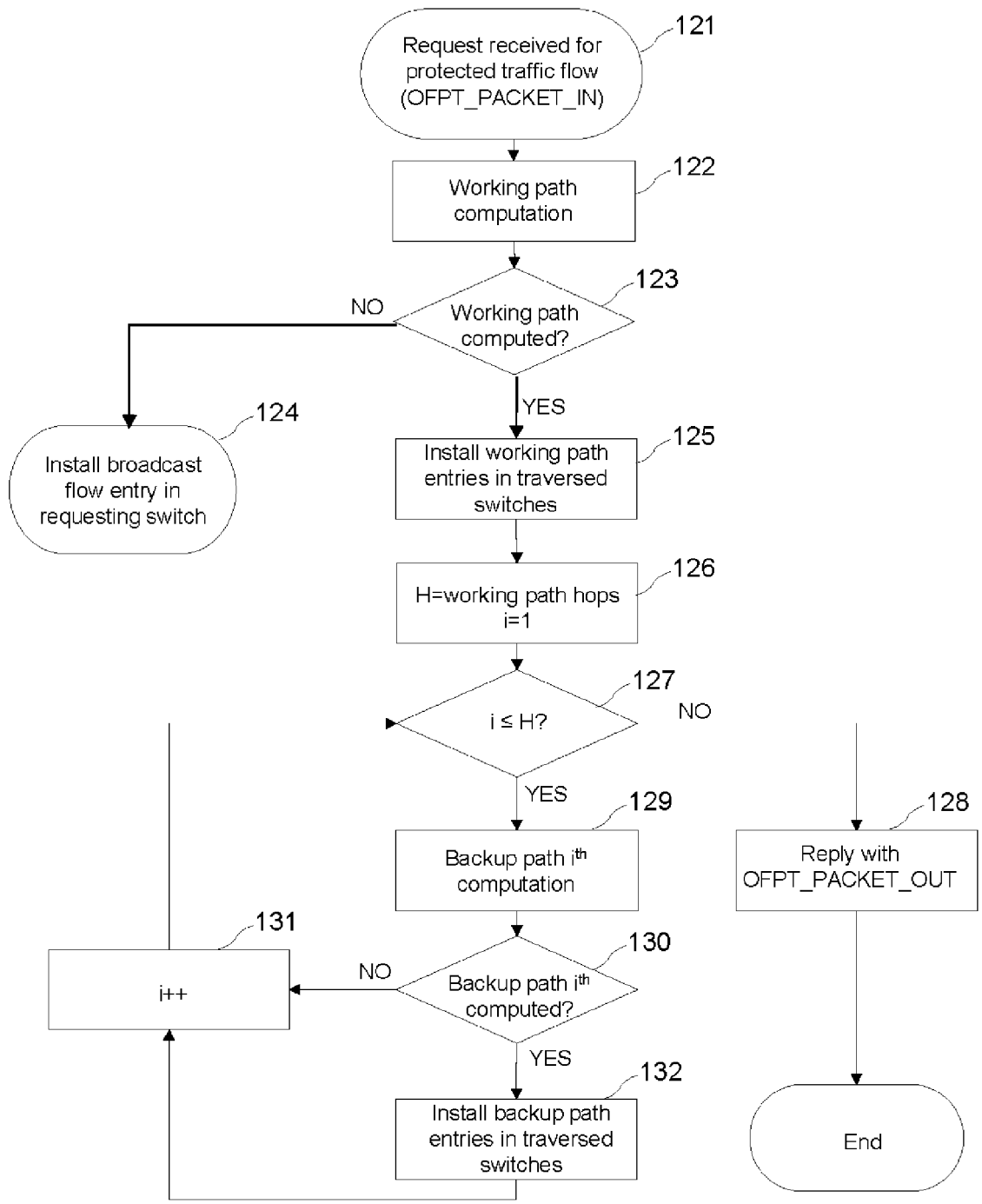

FIG. 13 shows the method of FIG. 12 in more detail. At step 122 a request is received for a protected traffic flow. The working path is computed at step 122. If the working path was successfully computed then the method proceeds to step 125 and flow entries are installed in switches traversed by the working path. If the working path was not successfully computed then the method can proceed to step 124 and can install a broadcast flow entry in the requesting switch. The "broadcast flow entry" is a flow entry used in the action field to forward the packet on "OFP_FLOOD" port. This is a virtual port utilised to send a packet on all the admitted ports (ports with the flood capability set to true). Usually, at the begin of each communication an Src host sends an ARP packet with a broadcast destination address. Thus a "broadcast flow entry" in the switch can be used to avoid additional requests to the controller in case of other Src connections or in case of gratuitous ARP messages sending. This feature is optional, and helps to prevent the controller from being overloaded by ARP packets. It is also advantageous to add a broadcast entry when the path computation fails because, in embodiments, the path computation only fails when the controller does not know where the destination is. In this case the broadcast entry is required so that the ARP packet will reach all the hosts in the network and Dst will reply to the ARP. Step 126 determines a number of hops, H, (=links) of the working path. Steps 127, 129, 130, 131 form a loop to compute a working path for each point of failure in the working path. Step 129 computes the i$^{th}$ backup path. The loop continues until step 130 determines that all of the backup paths have been computed. Step 132 installs flow entries for the computed backup paths in switches traversed by the backup paths. Step 128 sends an OFPT_PACKET_OUT message to the requesting node when the method is complete.

Figure 14:
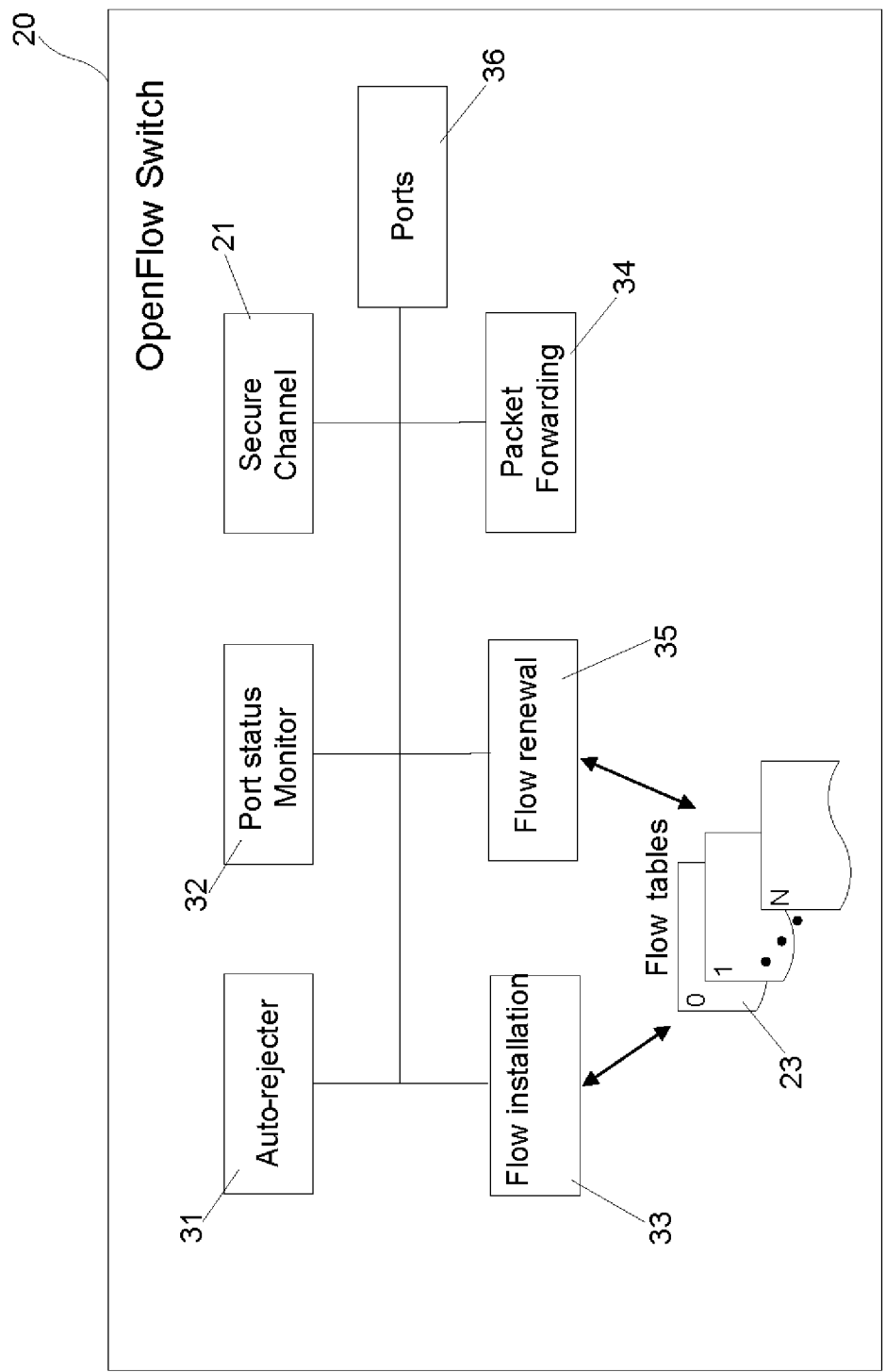
FIG. 14 schematically shows an OpenFlow switch.

FIG. 14 schematically shows a switch 20 according to an embodiment. A secure channel module 21 is provided for communicating with the controller 10. A set of ports 36 connect to links to other nodes 10. A set of Flow tables 23 are provided for storing forwarding instructions, and matching criteria, as described above. A packet forwarding module 34 forwards packets based on a match made in the flow tables 23. A port status monitor module 32 monitors for when a link has failed. Module 32 can detect a failure on an interface which connects to the link. Alternatively, it is possible for this module 32 to use Operation, Administration and Maintenance (OAM) signalling to establish when a failure has occurred. Use of bidirectional Forwarding Detection (BFD) packets is described in WO2011/144495A1. An embodiment can use BFD packets to detect failure of a link, in the manner described in WO2011/144495A1. In another embodiment, OAM signalling is not used for this purpose to help simplify implementation and processing overheads at nodes. An auto-rejecter module 31 removes flow entries from the flow tables 23 based on information received from the port status monitor module 32. As described above, when a link is determined to have failed, all flow entries which use the port connected to that link are removed from the flow tables 23. A flow installation module 33 installs flow entries in the flow tables 23 according to instructions received from the controller via the secure channel 21. A flow renewal module 35 renews flow entries in the flow tables 23 based on at least one of: (i) an association between the flow entry for the backup path and a flow entry for a working path at the node; and (ii) receiving a packet from another node indicating that the flow entry for the backup path should be renewed.

Figure 15:
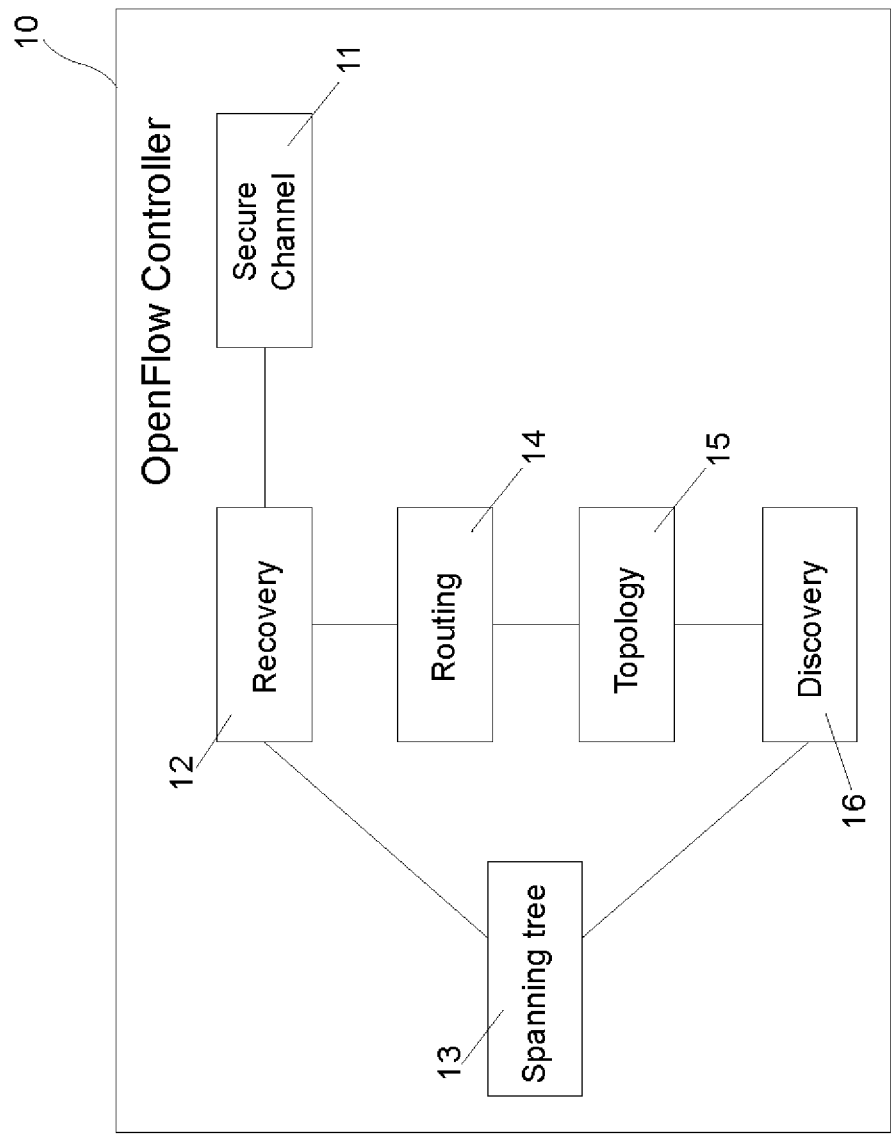
FIG. 15 schematically shows an OpenFlow controller.

FIG. 15 schematically shows a controller 10 according to an embodiment. A secure channel module 11 is provided for communicating with the switch 20. The controller acquires topology information about the network of switches using a discovery module 16 and topology module 15. The discovery module 16 detects all links in the network 5, such as by sending Link Layer Discovery Protocol (LLDP) packets. A spanning tree module 13 computes a spanning tree of shortest paths between nodes using the topology information from module 15. A recovery module 12 responds to requests to compute protected path between nodes, and uses the spanning tree 13 and routing module 14 to compute a working path and at least one backup path, as described above. The recovery module 12 communicates instructions to traversed switches using the secure channel 11.

Figure 16:
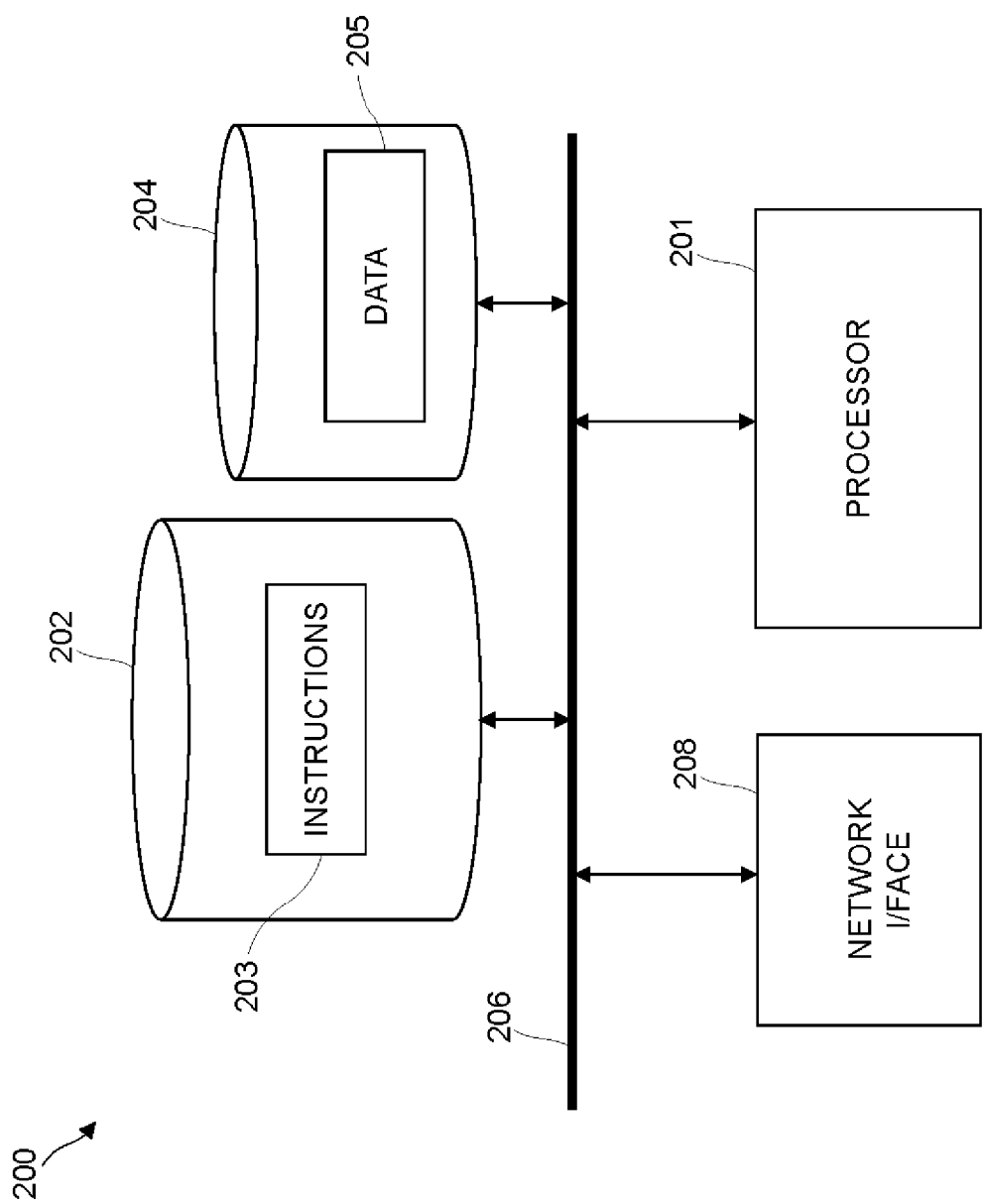
FIG. 16 shows processing apparatus for implementing the switch or controller.

FIG. 16 shows an exemplary processing apparatus 200 which may be implemented as any form of a computing and/or electronic device, and in which embodiments of the system and methods described above may be implemented. Processing apparatus 200 can be provided at one of the nodes 20 to implement a switch, or at a node to implement the controller 10. Processing apparatus may implement the method shown in any of FIGS. 10-13. Processing apparatus 200 comprises one or more processors 201 which may be microprocessors, controllers or any other suitable type of processors for executing instructions to control the operation of the device. The processor 201 is connected to other components of the device via one or more buses 206. Processor-executable instructions 203 may be provided using any computer-readable media, such as memory 202. The processor-executable instructions 203 can comprise instructions for implementing the functionality of the described methods. The memory 202 is of any suitable type such as read-only memory (ROM), random access memory (RAM), a storage device of any type such as a magnetic or optical storage device. Additional memory 204 can be provided to store data 205 used by the processor 201. The processing apparatus 200 comprises one or more network interfaces 208 for interfacing with other network entities, such as other nodes 20 of the network 5.

Figure 17:
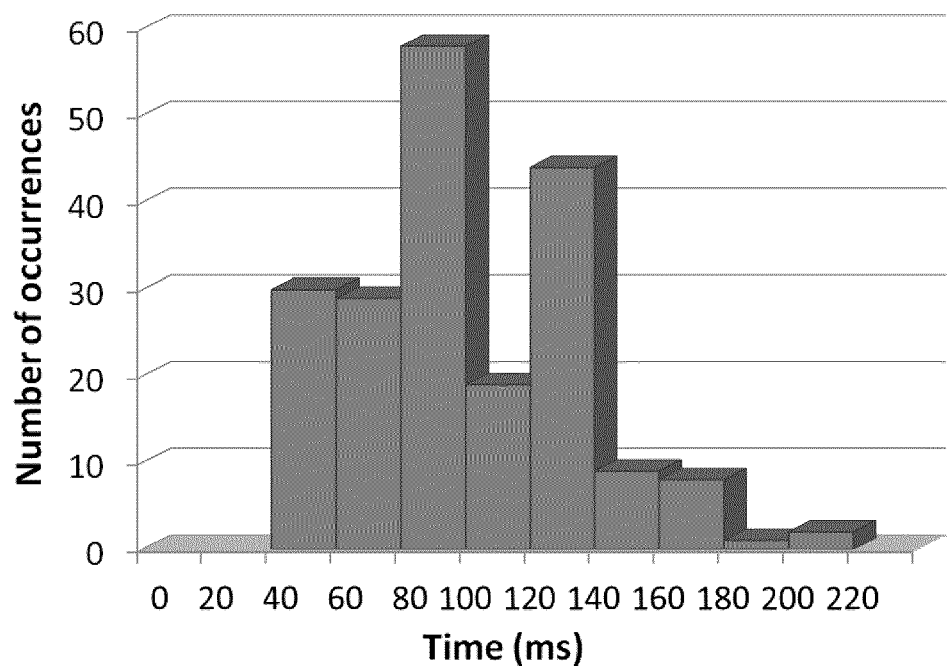
FIGS. 17 and 18 show results of a simulation of a network according to an embodiment.
Figure 18:
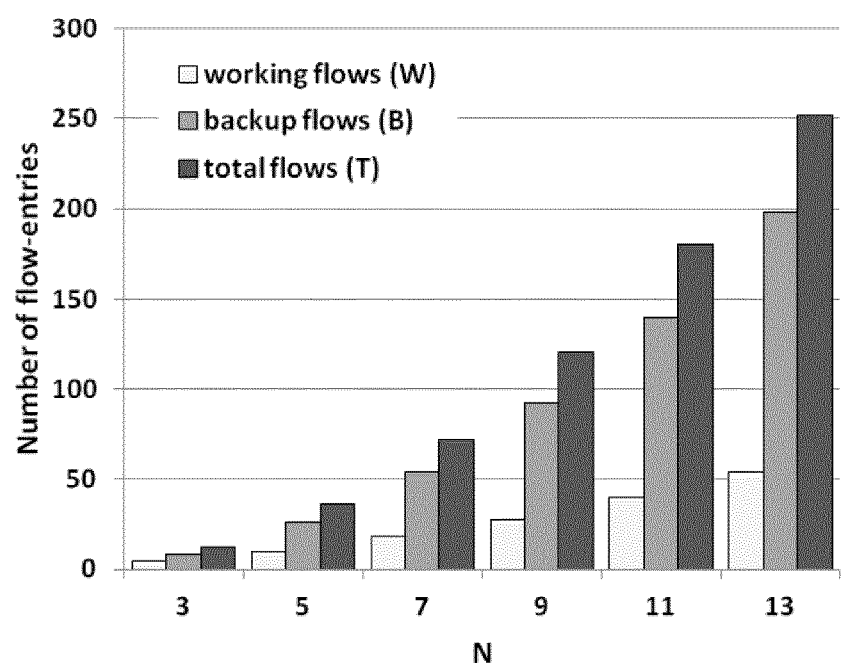

A recovery mechanism of the type described above has been implemented on a ring of N=5 nodes. A server (e.g., Quad Core CPU 3.00 GHz, 1 GB RAM, Ubuntu 11.10 kernel 3.0.0-16-generic) acts as the OpenFlow controller, based on the NOX controller version 0.9.1-full-beta. Another five servers (Quad Core CPU 2.4 GHz, 2 GB RAM, Ubuntu 10.04 kernel 2.6.32-25-generic) work as OpenFlow-based switches, running Open vSwitch version 1.1.1. Each server uses an Ethernet adapter of the family Intel Quad Port server adapter Pci-Express, providing four interfaces. Upon failure occurrence, data packets are lost during the switch-over time. In the considered test a traffic generator is used to generate packets from node Src to Dst with a rate of 1000 packets per second. After each failure, packet loss value is registered; then traffic is stopped and, when the failed link is recovered, the stream is restarted. The failure of link B-C is repeated 200 times. FIG. 17 illustrates the obtained switch-over time distribution. The average value is 101.5 ms. In particular, the obtained distribution is concentrated in the range of 40-140 ms, with few cases in the range 140-210 ms. The obtained switch-over time is due only to the physical detection time, i.e., the time needed by the switch attached to the disrupted link for detecting the link failure. Moreover, traffic disruption is not experienced upon recovery of the failed link. For supporting the required working and backup paths, a number of flow entries has to be installed in each switch. The number of required entries per switch has been evaluated considering rings composed of N switches and, with one host connected to each switch and a protected flow between each pair of hosts. FIG. 18 illustrates the number of required entries per switch. The trend is described by equations (1), (2) and (3).

$$W = 2(N-1) + 2 \sum_{i=0}^{\frac{N+1}{2}-2} i \quad (1)$$

$$B = N^2 + N - 4 + 2u(N-5) \sum_{i=0}^{\frac{N-1}{2}-2} i \quad (2)$$

$$T = W + B \quad (3)$$

The u(n) function above is defined as following:

$$u(n) = \begin{cases} 0 & n < 0 \\ 1 & n \geq 0 \end{cases} \quad (3)$$

Current Field Programmable Gate Array (FPGA) implementation of OpenFlow switches support several thousands of simultaneously active entries. Considering the above equations, the proposed architecture scales up to rings composed of several tens of switches. Therefore the proposed protection solution is fully suitable for metro networks.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of supporting traffic recovery at a switching node of an OpenFlow network, wherein the switching node has a plurality of ports and the switching node has at least one flow table for storing flow entries which determine forwarding of received packets between the ports, the method comprising:
   receiving an instruction from a controller to configure a backup path at the switching node;
   installing a flow entry for the backup path in the at least one flow table of the switching node;
   monitoring an idle period for which a flow entry has not been used; and
   renewing the flow entry for the backup path based on at least one of:
      an association between the flow entry for the backup path and a flow entry for a working path at the switching node, wherein the flow entry for the backup path is renewed when the flow entry for the working path is used to forward a received packet;
      receiving a flow entry renewal packet from another switching node on the backup path;
   wherein the renewing comprises resetting the idle period.

2. A method according to claim 1 wherein the association is between the flow entry for the backup path and the flow entry for the working path, wherein the flow entry for the working path defines a forwarding from a first port and the flow entry for the backup path defines a forwarding from a second port.

3. A method according to claim 1 wherein there is a plurality of flow entries for backup paths and the plurality of flow entries are associated with the flow entry for the working path at the node.

4. A method according to claim 1 further comprising receiving an instruction to configure the working path at the switching node and installing a flow entry for the working path in the at least one flow table of the switching node.

5. A method according to claim 4 wherein the flow entry for the working path has a higher priority entry compared to the flow entry for the backup path.

6. A method according to claim 5 further comprising determining a failure in the working path and, in response to determining the failure, removing the flow entry associated with the working path and using the flow entry for the backup path to forward received packets.

7. A method according to claim 1 further comprising sending a flow entry renewal packet to another switching node of the backup path.

8. A method according to claim 1 further comprising determining a failure of a link connected to one of the ports of the switching node and, in response to determining the failure, removing any of the flow entries in the at least one flow table which use that port.

9. A method according to claim 1 wherein each flow entry comprises a source address and a destination address and the step of renewing the flow entry for the backup path based on an association between the flow entry for the backup path and a flow entry for a working path at the node comprises associating flow entries with the same source address and destination address.

10. A method according to claim 1 wherein the step of renewing the flow entry for the backup path based on receiving a flow entry renewal packet from another switching node comprises receiving a flow entry renewal packet carrying information which matches a flow entry for the backup path.

11. A method according to claim 10 wherein the flow entry for the backup path comprises a source address and a destination address and wherein the flow entry renewal packet includes the same source address and destination address.

12. A method according to claim 10 wherein the flow entry renewal packet comprises a field indicating that the packet is for the purpose of flow entry renewal.

13. A method according to claim 1 further comprising:
   receiving an instruction from the controller to configure the sending of flow entry renewal packets along the backup path;
   sending, on a periodic basis, a flow renewal packet to another switching node on the backup path.

14. Apparatus for use at a switching node of an OpenFlow network comprising:
   a plurality of ports for connecting to links to other switching nodes;
   at least one flow table for storing flow entries which determine forwarding of received packets between the ports;
   an interface for communicating with a controller;
   a flow entry installation module which is arranged to receive an instruction from the controller to configure a backup path at the switching node and to install a flow entry for the backup path in the at least one flow table; and
   a flow entry renewal module which is arranged to renew the flow entry for the backup path based on at least one of:
      an association between the flow entry for the backup path and a flow entry for a working path at the node, wherein the flow entry for the backup path is renewed when the flow entry for the working path is used to forward a received packet;
      receiving a flow entry renewal packet from another switching node on the backup path.

15. Apparatus for use at a controller of an OpenFlow network, the OpenFlow network comprising a plurality of switching nodes, the apparatus comprising:
   an interface for communicating with the switching nodes, wherein the interface is arranged to receive a request for a protected traffic path between a first switching node and a second switching node of the OpenFlow network;
   a working path route computation module arranged to compute a working path between the first switching node and the second switching node of the OpenFlow network via at least one intermediate switching node;
   a backup path route computation module arranged to compute a backup path between the first switching node and the second switching node;
   a recovery module arranged to send instructions to the switching nodes to configure the working path and the backup path and to send an instruction to configure at least one of the switching nodes on the working path to periodically send a flow renewal packet along the backup path to renew the flow entry for the backup path in switching nodes of the backup path.

16. A method of supporting traffic recovery in an OpenFlow network comprising a controller connected to a plurality of switching nodes, wherein the switching nodes are connected by links, the method comprising, at the controller:

receiving a request for a protected traffic path between a first switching node and a second switching node of the OpenFlow network;

computing a working path between the first switching node and the second switching node of the OpenFlow network via at least one intermediate switching node;

computing a plurality of backup paths between the first switching node and the second switching node;

sending instructions to the switching nodes to configure the working path and the plurality of backup paths.

17. A method according to claim 16 wherein each of the plurality of backup paths corresponds to a different possible point of failure in the working path.

18. A method according to claim 17 wherein the step of computing a plurality of backup paths is performed for a point of failure in each link of the working path.

19. Apparatus for use at a controller of an OpenFlow network, the OpenFlow network comprising a plurality of switching nodes, the apparatus comprising:

an interface for communicating with the switching nodes, wherein the interface is arranged to receive a request for a protected traffic path between a first switching node and a second switching node of the OpenFlow network;

a working path route computation module arranged to compute a working path between the first switching node and the second switching node of the OpenFlow network via at least one intermediate switching node;

a backup path route computation module arranged to compute a plurality of backup paths between the first switching node and the second switching node;

a recovery module arranged to send instructions to the switching nodes to configure the working path and the plurality of backup paths.

* * * * *